(12) United States Patent
Chung (10) Patent No.: US 12,481,335 B2
(45) Date of Patent: Nov. 25, 2025

(54) HOLDERS FOR COMPUTING COMPONENTS

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 85 days.

(21) Appl. No.: 18/248,234

(22) PCT Filed: Oct. 7, 2020

(86) PCT No.: PCT/US2020/054585
§ 371 (c)(1),
(2) Date: Apr. 6, 2023

(87) PCT Pub. No.: WO2022/075985
PCT Pub. Date: Apr. 14, 2022

(65) Prior Publication Data
US 2023/0418343 A1 Dec. 28, 2023

(51) Int. Cl.
*G06F 1/18* (2006.01)
*H05K 7/14* (2006.01)

(52) U.S. Cl.
CPC .............. *G06F 1/186* (2013.01); *G06F 1/185* (2013.01); *H05K 7/1418* (2013.01); *H05K 7/1461* (2013.01)

(58) Field of Classification Search
None
See application file for complete search history.

(56) References Cited

U.S. PATENT DOCUMENTS

| | | |
|---|---|---|
| 6,735,091 B2 | 5/2004 | Megason et al. |
| 7,746,665 B2 | 6/2010 | Junkins et al. |
| 8,289,690 B2 | 10/2012 | Chang et al. |
| 9,229,495 B2 | 1/2016 | Kuo |
| 9,791,900 B1 | 10/2017 | Beall et al. |
| 10,241,837 B2 | 3/2019 | Huang et al. |
| 2004/0084388 A1* | 5/2004 | Roesner .................. G06F 1/186 211/41.17 |
| 2005/0028325 A1* | 2/2005 | Carnevali ............. G06F 1/1632 24/3.7 |
| 2006/0245158 A1* | 11/2006 | Chen ...................... G11B 33/12 |
| 2009/0294618 A1* | 12/2009 | Huang ..................... G06F 1/187 248/316.1 |

(Continued)

FOREIGN PATENT DOCUMENTS

| | | |
|---|---|---|
| CN | 2354167 Y | 12/1999 |
| CN | 210776493 U | 6/2020 |

*Primary Examiner* — Allen L Parker
*Assistant Examiner* — Christopher L Augustin
(74) *Attorney, Agent, or Firm* — Quarles & Brady LLP (57) ABSTRACT

According to an example, a holder for a computing device comprises a first bracket, a second bracket, and a biasing element attached to the first bracket and the second bracket. The first bracket may comprise a first clamp to contact a first side of a computing component and a first attachment member to attach to the computing device so as to fix the first bracket within the computing device. The second bracket may comprise a second clamp to contact a second side of the computing component and aligned with the first clamp. The biasing element may bias the second clamp towards the first clamp.

19 Claims, 4 Drawing Sheets

(56) References Cited

U.S. PATENT DOCUMENTS

2012/0257346 A1   10/2012   Hulet
2014/0192073 A1   7/2014   Gorchetchnikov et al.
2018/0089562 A1   3/2018   Jin et al.

* cited by examiner

HOLDERS FOR COMPUTING COMPONENTS

BACKGROUND

Electronic devices such as computing devices may comprise a large number of computing components. These computing components may be attached to or disposed within a housing of the computing device, however, the dimensions of the computing components may vary depending on their manufacturer, their purpose, and their specifications. To assure that computing components are held properly, a variety of holders may be used.

BRIEF DESCRIPTION OF DRAWINGS

Features of the present disclosure are illustrated by way of example and are not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

Computing devices, e.g., desktop computers, all-in-one (AIO) computers, etc., comprise device housings to contain computing components. Among other things, factors that determine the size and the shape of device housings are the number and the size of computing components contained within their inner volume. Computing components are attached so that the integrity of the computer is assured. Since the inner volume of a computer is limited, computing components are attached within the inner volume of the computing device so as to achieve certain housing dimensions.

In order to support computing components, structural frames and support structures are used within the computing device. However, since some of the computing components may comprise a wide range of dimensions, many different types of brackets, mounting structures, frames, etc., may be necessary to accommodate the differently-sized components. This can be expensive and/or complex to have, and additionally, in case of replacing a computing component, the replacement component may comprise different sizes that may not be suitable with the component's support structure. Some supports that are used to hold computing components may comprise extra elements, such as screws, to clamp the computing component within the inner volume of the computing device. However, in addition to requiring extra tools, such as screwdrivers, they are designed to afford specific dimensions of the computing components.

Among other components, computing components that may have a wide range of dimensions are expansion cards. Expansion cards may be inserted into an expansion slot of a computing device to provide or expand functionalities of the computing device. Examples of expansion cards comprise video cards or graphics cards, sound cards, network cards, storage cards, modem cards, wireless cards, among others.

In order to attach computing components having a wide variety of sizes within the computing device, adjustable support structures or holders may be used. These adjustable holders may have a dimension (or dimensions) that may be adjustable so as to securely attach a computing component to the computing device. In addition to being adjustable, the holders described herein simplify the assembly process, and can be adjusted without having extra tools.

Disclosed herein are examples of computing devices comprising holders to hold computing components. Hence, different examples of computing devices and holders are described.

Figure 1A:
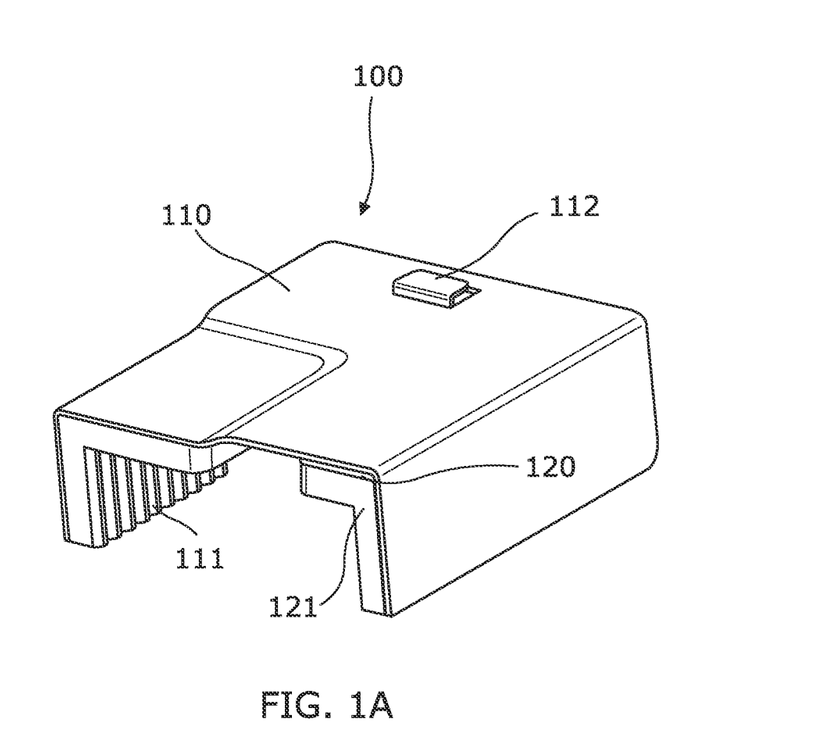
FIG. 1A shows a holder for a computing device, according to an example of the present disclosure.

Referring now to FIG. 1A, a holder 100 for a computing device is shown. The holder 100 comprises a first bracket 110, a second bracket 120, and a biasing element (not shown in FIG. 1A). The first bracket 110 comprises a first clamp 111 to contact a first side of a computing component and a first attachment member 112 to attach to the computing device so as to fix the first bracket 110 within the computing device. In FIG. 1A, the first bracket 110 is U-shaped and the second bracket 120 is L-shaped, wherein the second bracket 120 is disposed within the first bracket 110. However, in other examples, both brackets may be L-shaped and nested together such that the second bracket 120 may move relative to the first, or vice versa. In some other examples, each of the first bracket 110 and the second bracket 120 may be moveable.

As explained above, examples of computing devices comprise desktop computers and AIO computers, among others. In some examples, computing device may be an electronic device other than a computer, e.g., an imaging device such as a printer, or an additive manufacturing machine, i.e., 3D printer. The second bracket 120 comprises a second clamp 121 to contact a second side of the computing component and may be aligned with the first clamp 111, i.e., spaced apart at a distance from the first clamp 111 so as to engage with opposite sides of the computing component. Since the first clamp 111 and the second clamp 121 face with one another, the computing component is held tightly in place. In some examples, the first clamp 111 and the second clamp 121 may comprise a vibration absorbent material so as to reduce a transmission of vibration from the computing component to the computing device or vice versa. In the example of FIG. 1A, the first clamp 111 and the second clamp 121 comprise a series of parallel grooves in their surfaces in order to decrease the vibration transmitted to or from the computing device. The parallel grooves may contribute in the decrease of the vibrations transmitted. The holder 100 further comprises a biasing element attached to the first bracket 110 and engaged with the second bracket 120, wherein the biasing element biases the second clamp 121 towards the first clamp 111. In case of having a computing component between the first clamp 111 and the second clamp 121, the computing component is held in place by the holder 100 through the biasing element urging the second clamp 121 towards the first clamp 111.

In an example, the holder 100 is attached to a computing device by inserting the first attachment member 112 into an aperture of a housing of the computing device. Once the first attachment member 112 is placed within the aperture of the housing, a computing component may be clamped by the first clamp 111 and the second clamp 121. In case of having computing components of different dimensions, the biasing element of the holder 100 may enable a first side and a second side of the computing component to be clamped by biasing the second clamp 121 towards the first clamp 111.

Throughout the description, the term "attachment member" will be used to refer to any suitable element (or series of elements when using more than one for the same purpose) to attach or otherwise fasten a holder to the computing device. Examples of attachment members comprise fasteners such as pins, screws, rivets, adhesive, tabs, or other types of suitable fasteners.

In some examples, a computing component may comprise a cuboid shape and each of the first clamp 111 and the second clamp 121 contact opposite sides of the computing components. In an example, the computing component may be an expansion card to increase or to add features to the computing device.

In some other examples, the first bracket 110 may be identified as a fixed bracket and the second bracket 120 may be identified as a slidable bracket. The terms fixed and slidable are to be understood as a relative reference within the holder itself. However, in other examples in which the second bracket 120 (or slidable bracket) may not be nested within the first bracket 110, each of the first bracket 110 and the second bracket 120 may be slidable.

Biasing elements can include, amongst others, elastic elements, resilient elements, or any element capable of recovering size and/or shape after a deformation. Examples of elastic members include springs, leaf springs, spring plates, gas canisters, and other elements capable of recovering size and shape without a permanent deformation.

Figure 1B:
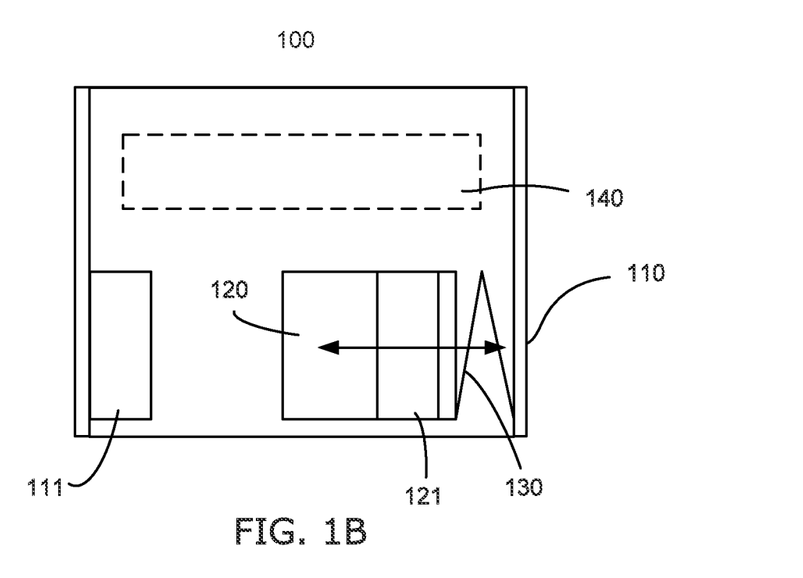
FIG. 1B shows a bottom side view of the holder of FIG. 1A.

Referring now to FIG. 1B, a bottom side view of the holder of FIG. 1A is shown. As described in reference with FIG. 1A, the first bracket 110 (or fixed bracket) comprises the first clamp 111 to contact a first side of a computing component. The second bracket 120 (or slidable bracket) comprises a second clamp 121 to contact a second side of the computing component, wherein the second clamp 121 is biased towards the first clamp 111 by a biasing element 130. The second clamp 121, which is facing the first clamp 111, has a range of lateral movement relative to the first clamp 111, wherein the range of lateral movement may be determined by, for instance, physical elements such as stoppers, tracks, rails, a length of the biasing element during a relaxed state, or a combination thereof. As previously described in reference with FIG. 1A, the first clamp 111 and the second clamp 121 may comprise vibration absorbent material. In other examples, the first bracket 110 and the second bracket 120 may have further surfaces comprising vibration absorbent material so as to mitigate the transmission to the computing device or vice versa.

In some examples, the first bracket 110 may further comprise a third clamp 140 (shown in FIG. 1B with dotted lines). The third clamp 140 may be used to contact a third side of the computing component. However, other examples may not comprise the third clamp 140.

In some other examples, the holder 100 may further comprise a third bracket comprising the third clamp 140 and a second biasing element to bias the third clamp 140 towards the first clamp 111 and the second clamp 121 such that the computing component is held in place by the first clamp 111, the second clamp 121, and the third clamp 140. The third clamp may comprise a vibration absorbent material so as to prevent the transmission of vibrations to or from the computing device.

Figure 2A:
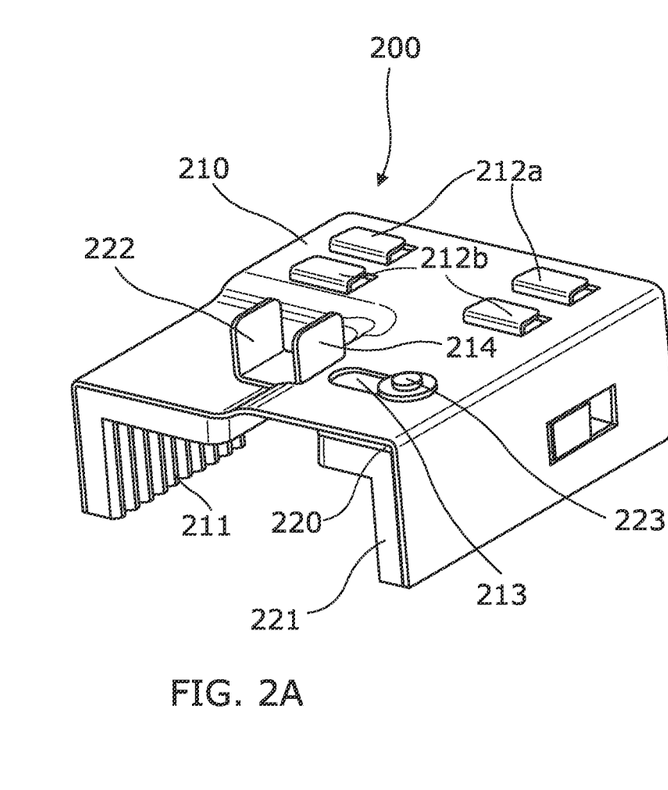
FIG. 2A shows a holder comprising a first attachment member and a second attachment member, according to an example of the present disclosure.

Referring now to FIG. 2A, a holder 200 comprising a first attachment member 212a and a second attachment member 212b is shown. The holder 200 comprises a first bracket 210, a second bracket 220, and a biasing element (not visible in FIG. 2A), wherein the first bracket 210 and the second bracket 220 can be alternatively referred to as a fixed bracket and a slidable bracket, respectively. As previously described, the second bracket 220 is nested within the first bracket 210. The first bracket 210 comprises a first clamp 211, the first attachment member 212a, the second attachment member 212b, an elongated slot 213 and a tab stopper 214. The first attachment member 212a and the second attachment member 212b may be used, as previously explained in the description, to attach the holder 200 to a computing device. In some examples, the first attachment member 212a may be rotated inwards into or bent or hidden within the first bracket 210 when the second attachment member 212b is attached to the computing device in order to fix properly the first bracket 210 to the computing device. In the same way, the second attachment member 212b may be rotated inwards into or bent or hidden within the first bracket 210 when the first attachment 212a is to be fixed to the computing device. By rotating inwards and outwards the first bracket 210, the attachment members can be hidden within the first bracket 210 when they are not being used to attach the first bracket 210 to the computing device.

Figure 2B:
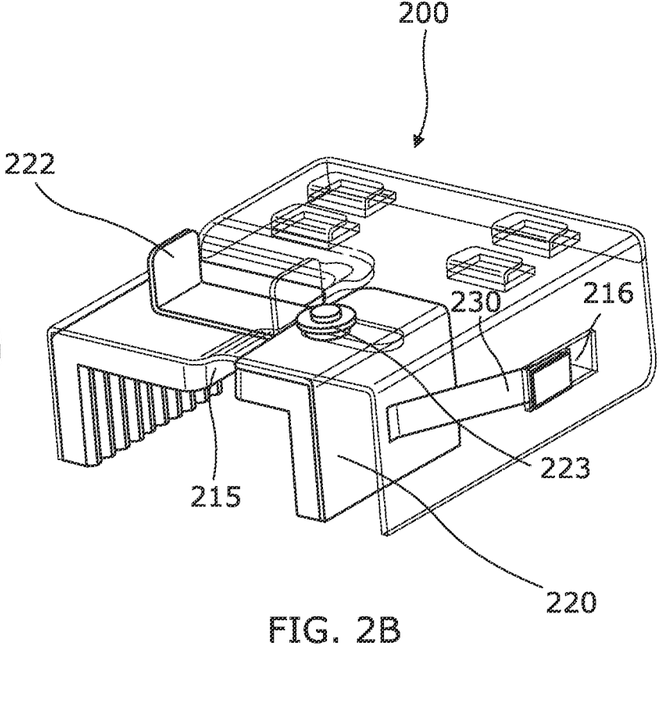
FIG. 2B shows a second view of the holder of FIG. 2A, according to an example of the present disclosure.

The second bracket 220 comprises a second clamp 221, a release tab 222, and a guiding element 223. The guiding element 223 is to be inserted in the elongated slot 213 such that a lateral movement of the second bracket 220 relative to the first bracket 210, i.e., a movement of the second bracket 220 towards the first clamp 211 of the first bracket 210, is enabled, and hence, a range of lateral movement between the second clamp 221 relative to the first clamp 211 is subsequently enabled. In FIGS. 2A and 2B, the guiding element 223 is inserted within the elongated slot 213 such that a range of lateral movement of the second bracket 220 relative to the first bracket 210 is defined by a length of the elongated slot 213. The release tab 222 may be used to move the second clamp 221 away from the first clamp 211. To move the second clamp 221 away from the first clamp 211, a force on the release tab in an opposite direction and greater in magnitude of a biasing force of the biasing element moves the second clamp 221 away from the first clamp 211. In case users may release the computing component, they may apply the force on the release tab so as to increase a distance between the first clamp 211 and the second clamp 221. The range of movement of the second clamp 221 may be determined by a contact between the release tab 222 and the tab stopper 214. However, in other examples, the range of movement of the second clamp is determined by a length of the elongated slot 213.

As previously explained in the description, the biasing element biases second clamp 221 of the second bracket 220 towards the first clamp 211 such that a computing component (not shown in FIG. 2A) is held in place when contacted by both the first clamp 211 and the second clamp 221. The first clamp 211 is to contact a first side of the computing component and the second clamp is to contact a second side of the computing component. In other examples, first bracket 210 of the holder 200 may further comprise a third clamp to contact a third side of the computing component. In some other examples, the holder 200 may further comprise a third bracket comprising a second biasing element and a third clamp, wherein the third bracket is coupled to the first bracket 210 such that a range of movement for the third clamp, relative to the first clamp 211 and second clamp 221, is enabled.

According to some examples, the first clamp 211, the second clamp 221, and the third clamp (if the holder comprises a third clamp) comprise a vibration absorbent material. Additionally, the clamps may comprise a series of grooves so as to further decrease the vibrations transmitted to or from the housing of the computing device. The series of grooves may further enable to apply a biasing force to a lower surface of the computing component compared with a clamp having a flat surface that contacts a larger surface of the computing component.

Referring now to FIG. 2B, a second view of the holder 200 of FIG. 2A is shown. In the second view, the first bracket 210 is transparent, i.e., the elements that were hidden in FIG. 2A by the first bracket 210 are visible. As previously described, the holder 200 comprises a biasing element 230 attached to the first bracket 210 and urged or pressed against the second bracket 220. In the example of FIGS. 2A and 2B, the first bracket 210 comprise a lateral aperture 216 in which the biasing element 230 is attached at one end, with another end engaged with the second bracket 220. Furthermore, in FIG. 2B the first clamp 211 comprises a clamp stopper 215, wherein the clamp stopper 215 is to contact the second clamp 221 such that a minimum distance between the first clamp 211 and the second clamp 221 is defined. In FIG. 2B, the second bracket 220, or second clamp 221 thereof, is disposed at the minimum distance from the first clamp 211. In the same way, the guiding element 223 rests against an opposite end of the elongated aperture 213 when the second clamp 221 is at the minimum distance from the first clamp 211.

In the example of FIGS. 2A and 2B, the biasing element 230 is a spring plate or leaf spring, however, other examples of biasing elements may be possible. In the same way, in other examples, the attachment of the biasing element may be different from the one represented in FIGS. 2A and 2B. In other examples, the elongated slot 213 of the first bracket 210 and the guiding element 223 of the second bracket 220 may be replaced for an elongated rod attached on the first bracket and a sliding element on the second bracket, such that a range of movement is enabled for the second bracket. Alternative attachments such as drive wheels, cogs, and teeth may be used instead of the guiding element and the elongated slot shown in FIGS. 2A and 2B.

Although in FIGS. 1A to 2B the first bracket comprises a U-shape and the second bracket comprises a L-shape that is nested together the first bracket, in other examples, the holder may comprise different types of brackets so as to provide an adjustable dimensions. In an example, each of the first bracket and the second bracket may comprise a L-shape, such that an overlap area is obtained between the brackets.

According to an example, a computing system comprises a housing having an inner surface, a computing component disposed within the housing, and an adjustable holder attached to the inner surface of the housing. As described above, housings may comprise inner surfaces in which computing components and/or holders may be disposed. The adjustable holder may correspond to one of the holders previously described in the description. The adjustable holder comprises a fixed bracket and a slidable bracket, wherein the fixed bracket comprises a first clamp and a spring plate contacting a slidable bracket and the slidable bracket comprises a second clamp. The spring plate biases the first clamp towards the second clamp. As a result, the computing component may be held in place by the first clamp and the second clamp. In other examples, the spring plate may be replaced for a biasing element attached to the fixed bracket and engaged with the slidable bracket, wherein the biasing element biases the second clamp towards the first clamp such that the first clamp contacts a first lateral side of the computing component and the second clamp contacts a second lateral side of the computing component. In some other examples, the computing component may be an expansion card such as a graphics card.

In an example, the fixed bracket comprises a U-shape and the slidable bracket comprises a L-shape. In other examples, the adjustable holder may comprise an extra clamp in order to hold the computing component in place.

According to some other examples, the fixed bracket of the adjustable holder may be attached to the inner surface of the housing via a series of attachment members such as a series of tabs, wherein the attachment members may be distributed so as to provide a series of fixing positions (or configurations) between the adjustable holder and the housing, as previously described in reference with FIGS. 2A and 2B.

Figures 3A, 3B:
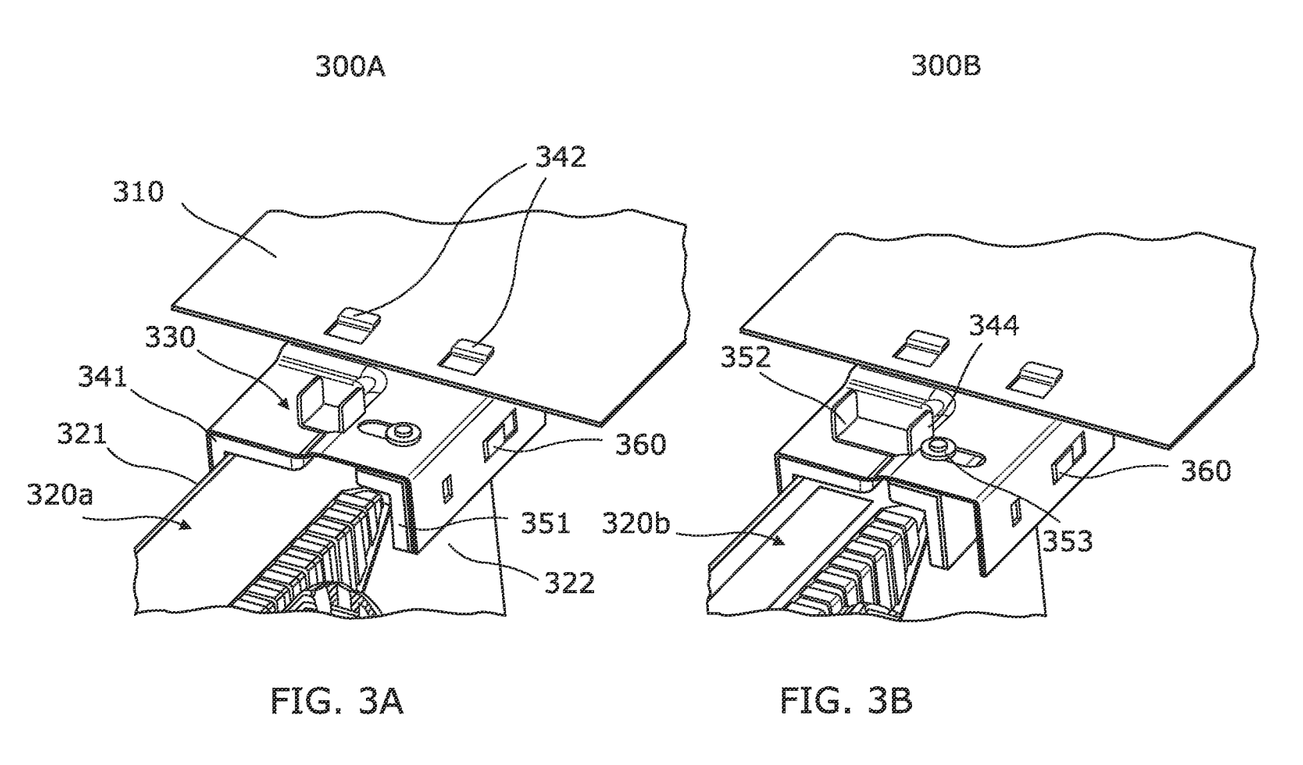
FIG. 3A shows a computing system comprising a computing component and a holder, according to an example of the present disclosure.
FIG. 3B shows a computing system comprising a second computing component and a holder, according to an example of the present disclosure.

Referring now to FIG. 3A, a computing system 300A comprising a first computing component 320a is shown. In some examples, computing system 300A may include or may be a part of a computing device as described elsewhere herein. The computing system 300A comprises an inner surface 310 of a housing of a computing device, the first computing component 320a, and a holder 330. In this example, the holder 330 is attached to the inner surface 310 via a pair of tabs 342. However, in other examples, the pair of tabs 342 may be replaced with other examples of attachment members. The first computing component 320a comprises a first side 321 and a second side 322, wherein the first side is contacted by a first clamp 341 of the holder 330 and the second side 322 is contacted by a second clamp 351. In an example, the first computing component 320a is an expansion card such as a graphics card. The holder 330 further comprises a biasing element 360 to bias the second clamp 351 towards the first clamp 341. The first bracket (or fixed bracket) of the holder 330 comprises a slot in which the biasing element is inserted such that a first end of the biasing element is inserted in the slot and a second end of the biasing element contacts (or engages with) the second bracket (or slidable bracket). In an example, the biasing element is a spring plate, as previously explained in reference to FIG. 2B. In other examples, the biasing element is attached to the first bracket and engaged with the second bracket.

In some examples, the first bracket of the holder 330 may further comprise a third clamp to contact a third side of the computing component 320a such that the first computing component 320a is held in place by the first clamp 341, the second clamp 351, and the third clamp.

In other examples, the holder 330 may further comprise a third bracket, wherein the third bracket comprises an additional biasing element engaged with the first bracket and a third clamp to contact a third side of the computing component 320*a* and substantially orthogonal to the first clamp and the second clamp, wherein the additional biasing element biases the third clamp towards the first clamp and the second clamp. In an example, the third bracket comprises a L-shape and is facing lateral sides of each of the first clamp 341 and the second clamp 351.

Referring now to FIG. 3B, a computing system 300B comprising a second computing component 320*b* is shown. In some examples, the computing system 300B may be similar to computing system 300A. The computing system 300B comprises the inner surface 310 and the holder 330 previously explained with reference to FIG. 3A, but the first computing component 320*a* has been replaced for the second computing component 320*b*. The second computing component 320*b* is thinner than the first computing component 320*a*, i.e., the distance between the first clamp and the second clamp is shorter when clamping computing component 320*b* than when clamping computing component 320*a*. Hence, a release tab 352 of a second bracket of the holder 330 is disposed farther from a tab stopper 344 of the first bracket of the holder 330 when clamping the second computing component 320*b* compared to clamping the first computing component 320*a* due to the smaller width of the second computing component 320*b*. As previously described in the description, a force on the release tab 352 in an opposite direction and greater in magnitude of a biasing force of the biasing element moves the second clamp 351 away from the first clamp 341. In case users may release the computing component 320*a*, they may apply a force on the release tab 352 so as to increase a distance between the first clamp 341 and the second clamp 351. In the same way, a guiding element 353 of the second bracket moves farther along an elongated slot of the first bracket. As explained above, a length of the elongated slot defines a range of lateral movement of the second bracket relative to the first bracket. The biasing element 360 biases the second clamp 351 towards the first clamp 341, thereby clamping the computing component 320*b* between the first clamp 341 and the second clamp 351.

Figure 4:
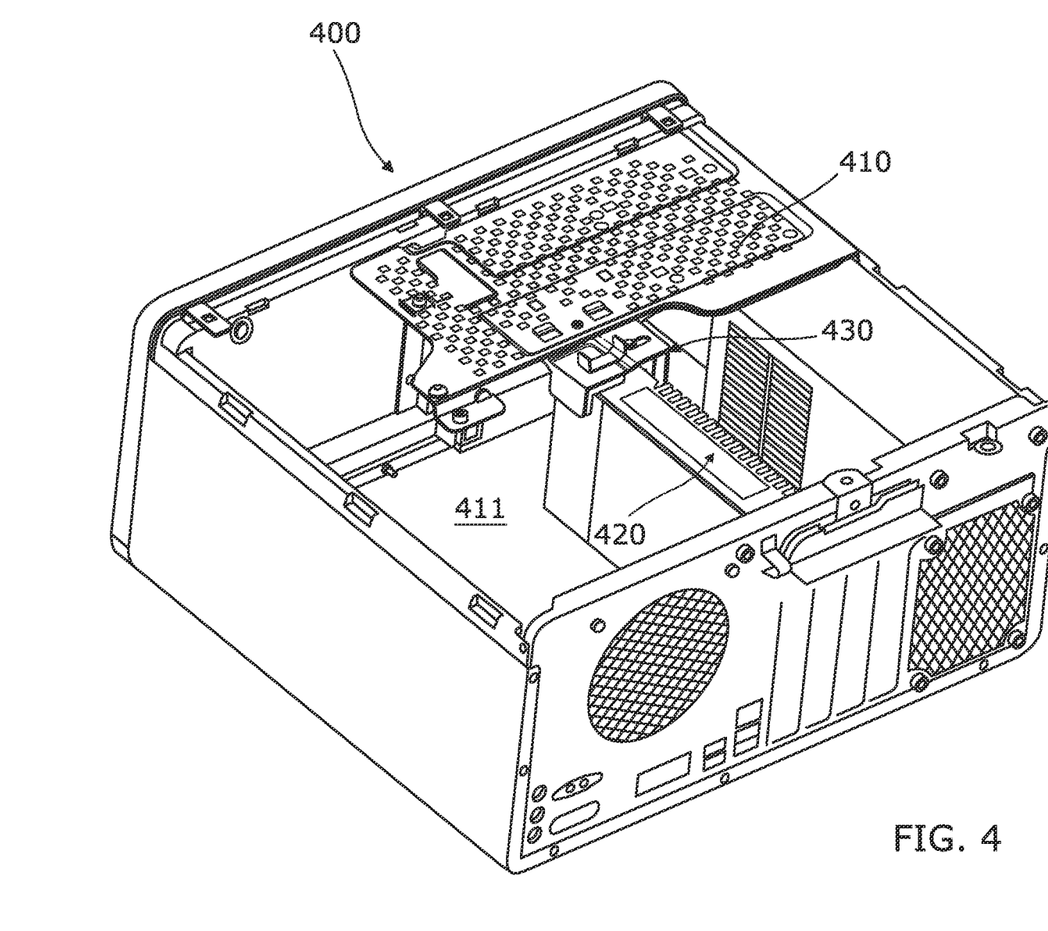
FIG. 4 shows a computing device having a holder, according to an example of the present disclosure.

Referring now to FIG. 4, a computing device 400 is shown. The computing device 400 comprises a device housing 410, an expansion card 420, and an adjustable holder 430. The adjustable holder 430 may correspond to one of the examples of holders previously described in the description. The holder 430 is disposed within an inner volume 411 of the device housing 410. The holder 430 comprises a first bracket comprising a first clamp and coupled to the device housing 410, a second bracket comprising a second clamp and movable within or relative to the first bracket, and a biasing element attached to the first bracket and engaged with the second bracket. The first clamp faces the second clamp such that a computing component, for instance an expansion card, can be clamped between the first clamp and the second clamp. The usage of the first clamp and the second clamp allows to retain the expansion card within the device housing. As previously explained in reference to other examples, the biasing element biases the second clamp towards the first clamp such that the first clamp contacts a first lateral side of the expansion card 420, and the second clamp contacts a second lateral side of the expansion card 420, which may be substantially opposite from the first lateral side.

According to some examples, the expansion card is a graphics card. In case of replacing the graphics card for a wider (or thinner) card, the holder 430 may clamp the wider (or thinner) card in the same way as explained for the expansion card 420. Furthermore, in order to increase a distance between the first clamp and the second clamp, a release tab may be brought together to a tab stopper so as to release the expansion card 420 that is being held by the holder 430.

In other examples, the first bracket may further comprise a third clamp to contact a third side of the expansion card 420 such that the expansion card 420 is held in place by the first clamp, the second clamp, and the third clamp. In some examples, each of the first clamp, the second clamp, and the third clamp comprise a vibration absorbent material.

According to some examples, the holder 430 may comprise a first attachment member and a second attachment member, wherein each of the attachment members enables an attachment configuration between the holder 430 and the housing 410. In some examples, the attachment members may be capable of rotating inwards while the first bracket (or main bracket) is not attached to the computing device. In the same way, the second attachment member may be capable of rotating inwards while the first bracket (or main bracket) is attached to the computing device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A holder for a computing device, wherein the holder comprises:
    a first bracket comprising:
        a first clamp to contact a first side of a computing component; and
        a first attachment member to attach to the computing device so as to fix the first bracket within the computing device;
    a second bracket comprising a second clamp to contact a second side of the computing component and aligned with the first clamp; and
    a biasing element attached to the first bracket and engaged with the second bracket, wherein the biasing element biases the second clamp towards the first clamp, wherein the biasing element is a spring plate.

2. The holder of claim 1, wherein the first bracket comprises a second attachment member to attach to the computing device so as to fix the first bracket within the computing device at a second fixing position, wherein the second attachment member is upstream the first attachment member.

3. The holder of claim 1, wherein the second bracket further comprises a release tab, wherein a force applied on the release tab in an opposite direction and greater in magnitude of a biasing force of the biasing element moves the second clamp away from the first clamp.

4. The holder of claim 1 further comprising a third bracket, wherein the third bracket comprises:
    an additional biasing element attached to the first bracket; and
    a third clamp to contact a third side of the computing component and substantially orthogonal to the first clamp and the second clamp, wherein the additional biasing element biases the third clamp towards the first clamp and the second clamp.

5. The holder of claim 4, wherein the first clamp, the second clamp, and the third clamp comprise a vibration absorbent material.

6. The holder of claim 1, wherein the first bracket is U-shaped and the second bracket is L-shaped.

7. The holder of claim 1, wherein the first bracket and the second bracket are both L-shaped.

8. The holder of claim 1, wherein the second bracket is nested within the first bracket.

9. The holder of claim 1, wherein the first clamp comprises a clamp stopper that contacts the second clamp when a minimum distance is reached between the first clamp and the second clamp.

10. The holder of claim 1, wherein:
the second bracket comprises a guiding element; and
the first bracket comprises a slot in which the guiding element is inserted such that a range of lateral movement of the second bracket relative to the first bracket is defined by a length of the slot.

11. A computing device comprising:
a device housing;
an expansion card; and
a holder disposed within an inner volume of the device housing, wherein the holder comprises:
a first bracket coupled to the device housing and comprising a first clamp;
a second bracket comprising a second clamp facing the first clamp; and
a biasing element attached to the first bracket and engaged with the second bracket, wherein the biasing element biases the second clamp towards the first clamp such that the first clamp contacts a first lateral side of the expansion card and the second clamp contacts a second lateral side of the expansion card to retain the expansion card within the device housing.

12. The computing device of claim 11, wherein the expansion card is a graphics card.

13. The computing device of claim 11, wherein the first bracket further comprises a third clamp to contact a third side of the expansion card such that the expansion card is held in place by the first clamp, the second clamp, and the third clamp.

14. The computing device of claim 13, wherein:
the second bracket comprises a guiding element; and
the first bracket comprises a slot in which the guiding element is inserted such that a range of lateral movement of the second bracket relative to the first bracket is defined by a length of the slot.

15. The computing device of claim 13, wherein each of the first clamp, the second clamp, and the third clamp comprise a vibration absorbent material.

16. A computing system comprising:
a housing having an inner surface;
a computing component disposed within the housing; and
an adjustable holder attached to the inner surface of the housing, the adjustable holder comprising:
a fixed bracket comprising:
a first clamp; and,
a spring plate contacting a slidable bracket; and
the slidable bracket comprising a second clamp,
wherein the spring plate biases the second clamp towards the first clamp,
wherein the computing component is held in place by the first clamp and the second clamp.

17. The computing system of claim 16, wherein the fixed bracket of the adjustable holder is attached to the inner surface of the housing via a series of tabs, the tabs being distributed so as to provide a series of positions between the adjustable holder and the housing.

18. The computing system of claim 16, wherein the fixed bracket comprises a slot in which the spring plate is inserted such that a first end of the spring plate is inserted in the slot and a second end of the spring plate contacts the slidable bracket.

19. The computing system of claim 18, wherein the first clamp and the second clamp comprise a vibration absorbent material.

* * * * *